United States Patent [19]

Blakely et al.

[11] Patent Number: 4,744,922
[45] Date of Patent: May 17, 1988

[54] NEUTRON-ABSORBING MATERIAL AND METHOD OF MAKING SAME

[75] Inventors: Keith A. Blakely, Buffalo; Peter T. B. Shaffer, Grand Island, both of N.Y.

[73] Assignee: Advanced Refractory Technologies, Inc., Buffalo, N.Y.

[21] Appl. No.: 884,046

[22] Filed: Jul. 10, 1986

[51] Int. Cl.$^4$ .................. C04B 35/68; G21F 1/06; G21C 11/06

[52] U.S. Cl. ................... 252/478; 250/517.1; 250/518.1; 264/29.1; 264/29.5; 264/63; 264/65; 376/339; 376/419; 501/88; 501/90; 501/91; 501/92; 501/93

[58] Field of Search .............. 264/0.5, 29.5, 63, 65, 264/66; 252/628, 629, 478, 636, 638, 643; 376/419, 339; 427/5, 6, 29.1; 430/953; 501/87, 88, 90, 91, 92, 93; 250/517.1, 518.1, 519.1

[56] References Cited

U.S. PATENT DOCUMENTS

| | | | |
|---|---|---|---|
| 3,356,618 | 12/1967 | Rich et al. | 376/419 |
| 3,887,807 | 6/1975 | Poignant, Jr. et al. | 376/159 |
| 4,225,467 | 9/1980 | McMurtry et al. | 376/339 |
| 4,252,691 | 2/1981 | Lipp et al. | 252/478 |
| 4,293,598 | 10/1981 | Hortman et al. | 427/203 |
| 4,474,728 | 10/1984 | Radford | 376/339 |
| 4,514,346 | 4/1985 | Luhleich et al. | 264/63 |
| 4,566,989 | 1/1986 | Radford et al. | 376/339 |

*Primary Examiner*—Stephen J. Lechert, Jr.
*Assistant Examiner*—Howard J. Locker
*Attorney, Agent, or Firm*—Sommer & Sommer

[57] ABSTRACT

A neutron-absorbing material is formed by a process which includes the steps of: mixing an absorptive material having a high thermal neutron capture cross-section (e.g., $B_4C$), a neutron-moderating material (e.g., graphite) and a binder (e.g., a phenol formaldehyde resin); shaping such mixture; curing such shaped mixture (e.g., to complete polymerization of the resin and to have only a carbon residue); and siliconizing such shaped and cured mixture. The resulting product has been formed to be denser and stronger, and more oxidation- and abrasion-resistant than prior art compositions.

27 Claims, No Drawings

NEUTRON-ABSORBING MATERIAL AND METHOD OF MAKING SAME

BACKGROUND OF THE INVENTION

The present invention relates generally to the field of nuclear reactors, and, more particularly, to an improved method of making a neutron-absorbing material for use in such reactors and the improved material produced by this method.

It has long been known that certain elements, such as boron, have a capability of absorbing thermal neutrons. These neutron-absorbing elements are commonly used in the control rods of a nuclear reactor, which may be selectively lowered into the reactor core to slow down the reaction. Some types of reactors have a hopper of "shut-down" balls or pellets positioned overhead the core such that, in the event of an emergency, the balls may be released into the core to slow down the reaction.

Heretofore, such "shut-down" balls have been manufactured by hot-pressing, extruding or otherwise bonding boron carbide ($B_4C$) and graphite (C) together. While containing the desired quantities of elemental boron, such prior art "shut-down" balls proved to have a number of disadvantages. Specifically, these disadvantages included a low abrasion resistance, as manifested by a tendency to dust or chalk (and thus allow uncontrolled and unrecoverable release of the neutron-absorbing material into various areas of the reactor), a tendency to oxidize, and were susceptible of severe erosion when subjected to heated water vapor rising upward from the reactor core. Further details as to such prior art control materials and the uses therefor may be found in one of the followig U.S. Pat. Nos.: 3,088,903, 3,108,886, 3,146,281, 3,403, 008, 3,565,762, 3,769,160, 3,914,371, 4,076,583, 4,213,883, and 4,474,728.

SUMMARY OF THE INVENTION

The present invention provides an improved method of making a neutron-absorbing material, and the improved material produced by this method. Such material is particularly suited for, but not limited to, use in the control rods of a nuclear reactor, as "shut-down" balls or pellets for use with a reactor, for fusion reactor shielding, spent fuel storage racks, neutron shielding, and the like. Unlike prior art "shut-down" balls, the improved material is denser, more oxidation-resistant, is non-dusting, and stronger.

The improved neutron-absorbing material is formed by a process which broadly includes the steps of: mixing an absorptive material having a high thermal neutron capture cross-section, a neutron-moderating material and a binder; shaping the mixture; curing the shaped mixture; and thereafter siliconizing the free carbon in the shaped and cured mixture. The absorptive material preferably contains an element selected from the group consisting of boron, gadolinium, europium, indium, samarium, dysprosium, iridium, thorium, and uranium. The neutron-moderating material contains a material such as carbon, preferably in the form of graphite. The binder may be a suitable phenol formaldehyde resin.

Accordingly, the general object of the invention is to provide an improved method of making a neutron-absorbing material.

Another object is to provide an improved neutron-absorbing material.

Still another object is to provide an improved neutron-absorbing material, which is particularly suited for use in control rods or as "shut-down" balls, which is denser, more oxidation-resistant, non-dusting and stronger than prior art compositions.

These and other objects and advantages will become apparent from the foregoing and ongoing written specificaion, and the appended claims.

DESCRIPTION OF THE PREFERRED EMBODIMENTS

The present invention broadly provides an improved neutron-absorbing material which is siliconized, thereby to enhance the non-dusting and oxidation-resistant characteristics and qualities of such material.

The improved material is formed by a process which broadly includes the steps of: mixing an absorptive material having a high thermal neutron capture cross-section, a neutron-moderating material and a binder together to form a mixture; shaping the mixture into a desired form; curing the shaped mixture; and siliconizing the shaped and cured mixture to produce the finished product.

The absorptive material contains a chemical element selected from the group consisting of boron, gadolinium, europium, indium, samarium, dysprosium, iridium, thorium, and uranium, Because of its availability and relatively low cost, such adsorptive material is preferably boron carbide ($B_4C$). The neutron-moderating material may be carbon (C), preferably in the form of powdered graphite. The binder is preferably a suitable phenol formaldehyde resin. The mixture may then be shaped as desired. Such shapes include, but are not limited to, suitable flowable forms, such as substantially spherical balls, cylindrical pellets, or the like. The shaped article is then cured, preferably in two stages. The first stage cure is to complete polymerization of the resin. The second stage cure decomposes the resin to a carbon residue. After curing, the shaped mixture is placed within an enclosure, preferably formed of graphite. Powdered elemental silicon metal (Si) is then added to the enclosure and the container is sealed and placed in a furnace and heated to a temperature sufficient for the silicon to react with the free carbon and form silicon carbide (SiC). If desired, the furnace may be simultaneously evacuated to remove escaping volatile impurities. Alternatively, the furnace may contain an inert gas, such as argon.

The resulting product has been found to be denser, stronger, more oxidation-resistant, and non-dusting, and substantially less susceptible to erosion when subjected to heated water vapor, when compared with prior art pressed boron carbide/ graphite compositions.

The invention may be further understood with reference to the following examples, in which all indicated percentages are by weight.

EXAMPLE ONE

An initial mixture containing approximately 6.39% boron carbide ($B_4C$) powder and 93.61% graphite powder was formed. To this mixture, 15% phenol formaldehyde resin was added. Thus, after addition of the resin, the mixture contained about 5.94% boron carbide, about 80.10% graphite, and about 13.95% resin. The mixture was then press-shaped into the form of spherical balls. Such balls were then subjected to a two-stage curing operation. During the first stage, the balls were placed in a furnace and heated to about 150° C. for about 1 hour to complete polymerization of the resin. The initially-cured balls were placed in another furnace and heated to the range of 400°–700° C. for about 4 hours to decompose the resin and to leave only a carbon residue. Thereafter, the cured balls were placed in a graphite container, to which powdered elemental silicon was added at the rate of about 218.4 grams of silicon per 100 grams of cured ball. Of this, only 17.5 grams of silicon was needed to convert the resin-residue carbon to silicon carbide. The balance of the added silicon was needed to convert the remaining free carbon (i.e., non-boron carbide) into silicon carbide. The container was then placed in an argon-environment furnace and heated to about 1900°–1950° C. for about 1 hour to cause the silicon to react with the free carbon and form silicon carbide. The balls were then cooled and removed from the container. The finished product was found to be denser and stronger than prior art boron carbide/graphite compositions, and was also found to exhibit greatly enhanced oxidation-resistant and abrasion-resistant properties. Such balls were also found to be non-dusting when compared with prior art compositions.

EXAMPLE TWO

An initial mixture containing approximately 76.67% boron carbine ($B_4C$) powder and about 23.34% graphite powder was formed. To this mixture, 15% phenol formaldehyde resin was added. Thus, after addition of the resin, the mixture contained about 71.3% boron carbide, about 14.7% graphite, and about 14% resin. The mixture was then press-shaped into spherical balls. Such balls were again subjected to a twostage curing operation. During the first stage, the balls were again placed in a furnace and heated to about 150° C. for about 1 hour to complete polymerization of the resin. Thereafter, the initially-cured balls were placed in another furnace and heated to the range of 400°–700° C. for about 4 hours to decompose the resin and leave only a carbon residue. Following the curing operation, the balls were again placed in a graphite container, to which powdered elemental silicon was added at the rate of about 54.5 grams of silicon per 100 grams of cured ball. Of this, only about 17.5 grams of silicon per 100 grams of cured ball was needed to convert the carbon residue resulting from decomposition of the resin. The balance of the silicon was needed to convert the remaining free carbon (i.e., non-boron carbide) into silicon carbide. The container was then placed in an argon-environment furnace and again heated to 1900°–1950° C. for about 1 hour to cause the silicon to react with the free carbon and form silicon carbide. The balls were then cooled and removed from the container. Again, the finished product was found to be denser and stronger than prior art non-siliconized compositions, and to exhibit greatly enhanced abrasion-resistant and oxidation-resistant properties. Here again, the balls were found to be non-dusting when compared with prior art compositions.

EXAMPLE THREE

An initial mixture containing about 13.7% boron carbide ($B_4C$) and about 86.3% graphite powder was formed. To this mixture, 15% phenol formaldehyde resin was added. Thus, after addition of the resin, the mixture contained about 12.0% boron carbide, about 75.0% graphite and about 13.0% resin. The mixture was then press-shaped into spherical balls. Such balls were subjected to a two-stage curing operation. During the first stage, the balls were placed in a furnace and heated to about 150° C. for about 1 hour to complete polymerization of the resin. During the second stage, the balls were placed in another furnace and heated to the range of 400°–700° C. for about 4 hours to decompose the resin and leave only a carbon residue. Such balls were then cooled. These balls are hereinafter referred to as the "non-siliconized" balls.

Thereafter, some of these balls were subsequently "siliconized" by placing the same within a graphite container, to which powdered elemental silicon metal was added at the rate of about 100 grams of silicon per 100 grams of "non-siliconized" balls. The container was then placed in an argon-environment furnace and heated to 1900°–1950° C. for about 1 hour to cause the silicon to react with the free carbon and form silicon carbide. These "siliconized" balls were then cooled and removed from the container. The "siliconized" balls contained about 6% boron (B), about 41.2% carbon (C), and about 52.8% silicon (Si). More particularly, the "siliconized" balls contained about 75.4% silicon carbide (SiC), about 7.7% boron carbide ($B_4C$), and about 16.9% carbon/graphite.

The improved qualities of the "siliconized" balls vis-a-vis the "non-siliconized" balls was dramatically illustrated when such balls were placed in a furnace and heated to the indicated temperature in an atmosphere of argon and steam for a period of three hours, as indicated in the following table:

TABLE I

| Temperature | Weight Loss (%) | |
| --- | --- | --- |
| | "non-siliconized" balls | "siliconized" balls |
| 300° C. | 1.0 | 0.1 |
| 600° C. | 1.9 | 0.4 |
| 800° C. | 16.1[2] | 0.1 |
| 1000° C. | 86.6[1] | 0.2 |
| 1200° C. | 99.7 | <0.1[3] |

[1]"non-siliconized" balls disintegrated
[2]above 800° C., substantially all elemental boron was lost
[3]no significant boron loss could be determined Thus, the "siliconized" balls proved to be stable when heated to elevated temperatures in an argon-water vapor atmosphere, whereas the "non-siliconized" balls experienced substantial loss of weight and boron content.

As demonstrated by the above examples, the relative proportions of the boron carbide and the free graphite in the initial mixture may be readily changed or varied, depending upon the amount of boron desired in the final product. The relative proportions of these two primary constituents may readily be changed because the silicon will react with the available free carbon to form silicon carbide. Thus, so long as there is sufficient free carbon to react with the silicon to form a product having the non-dusting and abrasion-resistant characteristics desired, the relative proportions of the neutron-absorbing material and the neutron-moderating material may be readily changed. Binders other than phenol formaldehyde resins may be used, as desired. While the product is preferably formed into a flowable shape, such as a substantially spherical ball or a short cylindrical pellet, the product may be formed into other shapes as well. This is particularly useful if the improved material is to be used as a part of a control rod. During the curing step, the furnace may be either evacuated so as to remove the volatile contaminants, or may be provided with an inert gas environment.

Therefore while two specific embodiments of the improved method have been described, and certain changes and modifications thereof discussed, persons skilled in this art will readily appreciate that various additional changes and modifications may be made without departing from the spirit of the invention, as defined and differentiated by the following claims.

What is claimed is:

1. A neutron-absorbing material formed by a process which includes the steps of:
   creating a mixture consisting of an absorptive material having a high thermal neutron capture cross-section and having an element selected from the group consisting of boron, gadolinium, europium, indium, samarium, dysprosium, iridium, thorium and uranium, (b) a neutron-moderating material consisting of either carbon or graphite, and (c) a phenol formaldehyde resin binder;
   shaping such mixture;
   curing such shaped mixture; and
   siliconizing such shaped and cured mixture by causing silicon to react with substantially all of the free carbon in such mixture to form silicon carbide.

2. A neutron-absorbing material as set forth in claim 1 wherein said absorptive material is boron carbide.

3. A neutron-absorbing material as set forth in claim 1 wherein said curing step completes polymerization of said resin.

4. A neutron-absorbing material as set forth in claim 1 wherein said curing step decomposes said resin to a carbon residue.

5. A neutron-absorbing material as set forth in claim 1 wherein said mixture is shaped into a flowable shape.

6. A neutron-absorbing material as set forth in claim 5 wherein said flowable shape is a substantially spherical ball.

7. A neutron-absorbing material as set forth in claim 1 wherein said siliconizing step includes the further steps of:
   placing said shaped and cured mixture into an enclosure;
   adding elemental silicon to said enclosure; and
   heating said enclosure to a temperature sufficient for said silicon to react with the free carbon to form silicon carbide.

8. A neutron-absorbing material as set forth in claim 7 wherein said enclosure is heated by placing said enclosure within a furnace.

9. A neutron-absorbing material as set forth in claim 8 and further comprising the additional step of:
   evacuating said furnace while heating said enclosure.

10. A neutron-absorbing material as set forth in claim 1 wherein said absorptive material is boron carbide, and wherein said neutron-moderating material is graphite.

11. A neutron-absorbing material as set forth in claim 10 wherein said mixture contains about 5.94% boron carbide, about 80.10% graphite, and about 13.95% resin.

12. A neutron-absorbing material as set forth in claim 10 wherein said mixture contains about 71.3% boron carbide, about 14.75% graphite, and about 14.00% resin.

13. A neutron-absorbing material as set forth in claim 10 wherein said mixture initially contains from about 6.39–76.67% boron carbide, and from 93.61–23.34% graphite, and to which said resin is added at the rate of about 15 grams per 100 grams of the initial mixture.

14. A method of making a neutron-absorbing material, comprising the steps of:
   creating a mixture consisting of (a) an absorptive material having a high thermal neutron capture cross-section and having an element selected from the group consisting of boron, gadolinium, europium, indium, samarium, dysprosium, iridium, thorium and uranium, (b) a neutron moderating material consisting of either carbon or graphite, and (c) a phenol formaldehyde resin binder;
   shaping such mixture;
   curing such shaped mixture; and
   siliconizing such shaped and cured mixture by causing silicon to react with substantially all of the free carbon in such mixture to form silicon carbide.

15. A method of making a neutron-absorbing material as set forth in claim 14 wherein said absorptive material is boron carbide.

16. A method of making a neutron-absorbing material as set forth in claim 14 wherein said curing step completes polymerization of said resin.

17. A method of making a neutron-absorbing material as set forth in claim 14 wherein said curing step decomposes said resin to a carbon residue.

18. A method of making a neutron-absorbing material as set forth in claim 14 wherein said mixture is shaped into a flowable form.

19. A method of making a neutron-absorbing material as set forth in claim 18 wherein said flowable form is a substantially spherical ball.

20. A method of making a neutron-absorbing material as set forth in claim 14 wherein said siliconizing step includes the further steps of:
   placing said shaped and cured mixture into an enclosure;
   adding elemental silicon to said enclosure; and
   heating said enclosure to a temperature sufficient for said silicon to react with the free carbon to form silicon carbide.

21. A method of making a neutron-absorbing material as set forth in claim 20 wherein said enclosure is heated by placing said enclosure within a furnace.

22. A method fo making a neutron-absorbing material as set forth in claim 21 and further comprising the additional step of:
   evacuating said furnace while heating said enclosure.

23. A method of making a neutron-absorbing material as set forth in claim 14 wherein said absorptive material is boron carbide, and wherein said neutron-absorbing material is graphite.

24. A method of making a neutron-absorbing material as set forth in claim 23 wherein said mixture contains about 5.94% boron carbide, about 80.10% graphite, and about 13.95% resin.

25. A method of making a neutron-absorbing material as set forth in claim 23 wherein said mixture contains about 71.3% boron carbide, about 14.7% graphite, and about 14.00% resin.

26. A method of making a neutron-absorbing material as set forth in claim 23 wherein said mixture is formed by initially mixing from about 6.39–76.67% boron carbide with from about 93.61–23.34% graphite, after which resin is added.

27. A method of making a neutron-absorbing material as set forth in claim 26 wherein said resisn is added at the rate of about 15.00% resin per 100 grams of such initial mixture.

* * * * *